June 24, 1930.    A. C. TALLADE    1,767,624
VALVE SYSTEM FOR RECIPROCATING ENGINES
Filed Dec. 1, 1926    2 Sheets-Sheet 1

INVENTOR
ALEXANDRE CARDUNETS TALLADE
BY
Louis Barnett.
ATTORNEY

June 24, 1930.   A. C. TALLADE   1,767,624
VALVE SYSTEM FOR RECIPROCATING ENGINES
Filed Dec. 1, 1926.   2 Sheets-Sheet 2
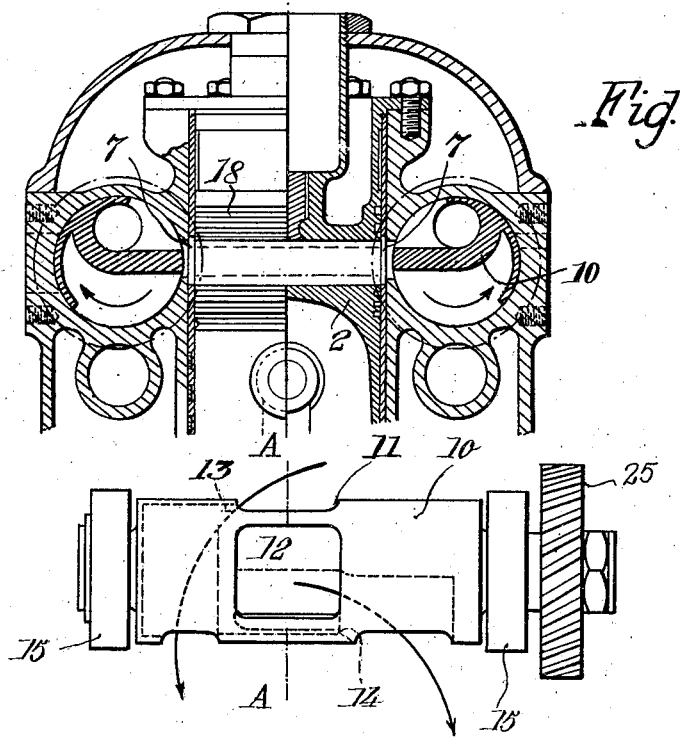
INVENTOR
ALEXANDRE CARDUNETS TALLADE
BY
Louis Barnett
ATTORNEY Patented June 24, 1930

1,767,624

UNITED STATES PATENT OFFICE

ALEXANDRE CARDUNETS TALLADE, OF BARCELONA, SPAIN

VALVE SYSTEM FOR RECIPROCATING ENGINES

Application filed December 1, 1926, Serial No. 151,889, and in France December 9, 1925.

This invention relates to valve systems for reciprocating engines such as compressors and thermal motors and more especially to internal combustion motors of the four-cycle type.

In prior art devices of this class various difficulties have presented themselves in connection with either the construction or operation of the valve systems connected to the motor. In engines of the Knight type, a pair of sleeves provided with intake and exhaust slots are arranged to slide inside a cylinder. The necessity of providing two sleeves has resulted in various complications both from a structural and operative standpoint. Valve systems comprising rotating valves controlling the feed and discharge of motor fluid suffer from the disadvantage of being seriously affected by heat and pressure. Some four cycle engines are provided with a single valve controlling alternately both the intake and the exhaust of motor fluid; but in motors of this type there is always a section of conduit connected to the valve which must function alternately as feed and exhaust conduit. As a consequence there is a certain amount of loss because of the condensation of combustible on the section of conduit subjected to alternate use as intake and exhaust.

One of the objects of the present invention is to provide a construction in which a single sleeve serves as a control of the feed and exhaust of motor fluid to the cylinder.

Another object is to provide a rotary valve system which is protected from the heat and pressure within the cylinder by the interposition of the sleeve during certain positions of each cycle of operation.

Still another object is to provide a rotary valve structure in which, distinct feed and discharge conduits or chambers are formed in the valve body, said conduits or chambers communicating independently with a common passage leading to the cylinder and with ports leading to the intake and exhaust manifolds.

Still further objects will appear in the course of the detailed description which will now be given in connection with the accompanying drawings in which:—

Fig. 2 is an elevation of one of the rotary valves shown in Fig. 1;

Fig. 3 is a section through the cylinder head with the valves shown in interchanged position relatively to Fig. 1.

Figure 1:
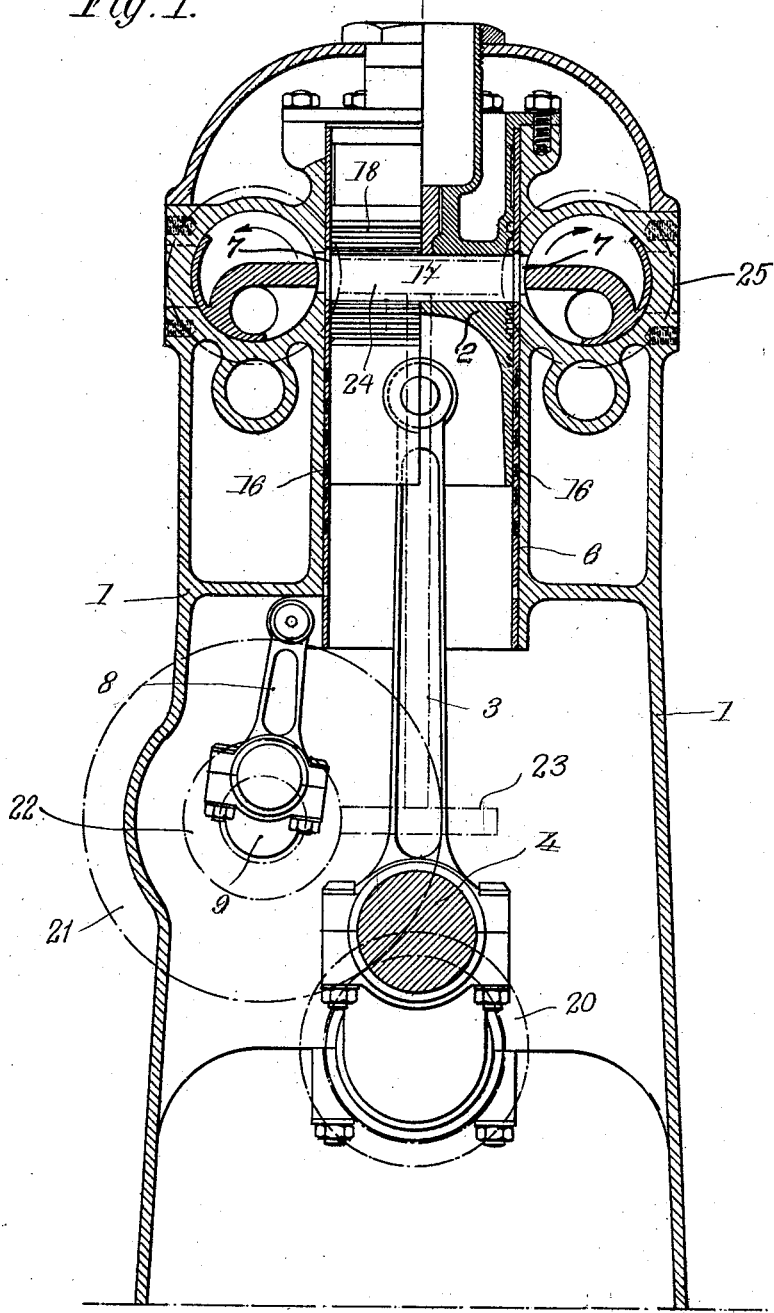
Fig. 1 is a vertical section through one cylinder of the engine.

Referring to the various figures of the drawing, there is shown a cylinder block 1 comprising a water-jacketed cylinder fitted at its upper end with a pair of rotary valves 10 controlling ports 5, and a piston 2, connected through connecting rod 3 to crank shaft 4. Piston 2 slides inside a cylindrical sleeve 6 provided with openings or slots 7. Slots 7 are located diametrically opposite one another so as to eliminate transverse stresses on the sleeve as a result of explosive pressures within the combustion chamber limited by piston 2, sleeve 6 and the fixed head 18. Sleeve 6 is reciprocated by connecting rod 8 mounted eccentrically (eccentric or crank shaft) on shaft 9 rotating at half the speed of main crank shaft 4. The sleeve is provided with grooves or recesses 16 to facilitate lubrication. Ports 5 communicate, on the one hand, with the explosion chamber through the intermediary of slots 7 and 7 in sleeve 6, and, on the other hand, with the intake and exhaust conduits through the intermediary of orifices 11 and 12 in the peripheral walls of rotary valves 10. Orifice 11 Figs. 2 and 3) is the terminal opening of longitudinal discharge chamber 13 formed in valve 10 and orifice 12 the corresponding opening for intake conduit or chamber 14. Feed chamber 14 and discharge chamber 13 communicate through proper orifices in the valve walls with the intake and discharge manifolds (not shown). The rotary valves are mounted, preferably, on ball bearings 15 and are set in motion at half the speed of crankshaft 4, by a system of gearing comprising a gear 20 mounted on the main crank shaft, a gear 21 keyed to shaft 9 and meshing with gear 20, a second gear 22 mounted on shaft 9, a toothed wheel 23 meshing with gear 22, and a second toothed wheel 24, driven from wheel 23 by common shafting or in any other way desired, said second wheel 24 meshing simultaneously with gears 25 attached to each valve. Gears 25 are cut, preferably, with teeth as shown in Fig. 2 and may be interchanged from one side of wheel 24 to the other.

The manner in which the motor operates is practically self-evident from the foregoing detailed description. Valves 10, rotated from the crank shaft or otherwise, both alternately feed gases into and discharge gases from the cylinder. Sleeve 6, isolates the rotating valves from the cylinder during all portions of the cycle of operation except for the brief periods of feeding and discharge. The rotating valves are protected from the high pressures and temperatures obtaining in the combustion chamber during the explosion proper. By extending the lubricating grooves or recesses 7 sufficiently high, the latter may be made to deliver a small quantity of lubricating oil to the rotating valves with each reciprocation of sleeve 6. Both the lubrication and the gas-tightness of valves 10 are, thus, assured. The number of orifices opening into the cylinder walls is reduced to a minimum, the single passage between the valve and the cylinder serving both as intake and discharge. The length of this passage, it will be noted, is reduced to the sum of the thicknesses of the cylinder wall and of the sleeve. The condensation of combustible within the passage will therefor be negligible in spite of its functioning alternately as intake and exhaust.

It is to be understood that the motor is not limited to the particular form of construction here shown. A single sleeve may be used in connection with a single rotating valve, with a pair of rotating valves, or, in the case of very high speed motors, with a multiplicity of such valves. It is further obvious that the construction here shown is not limited to any particular number of cylinders or to engines having any particular explosive cycle. The valves may be rotated at one quarter the speed of the crank shaft in a 4 cycle engine or their operation may be modified in other ways, the independent feed and discharge chambers in the valve bodies permitting considerable flexibility in operation.

In motors equipped with a pair of rotary valves it is preferable that said valves be made interchangeable. If it is desired at any time to reverse the direction of rotation of the motor, it is only necessary to interchange the valves mounted therein (see arrows in Figs. 1 and 3). The valves, in interchanged position, will rotate in the opposite direction to their original mounting and will rotate the crank-shaft in the direction opposite to the original direction of rotation.

What I claim is:—

1. An apparatus of the class described comprising in combination a cylinder having a passage formed in the wall thereof, a cylindrical sleeve slidably mounted inside the cylinder, said sleeve having a slot therethrough located so as to come opposite the passage in the cylinder wall during part of the sliding movement of the sleeve, a rotatable valve controlling the passage in the cylinder wall, said rotatable valve having a feed and a discharge orifice in its peripheral wall spaced so as to communicate with the passage in the cylinder wall during the intake and discharge periods respectively, said orifices being isolated from one another by a wall formed inside the valve and dividing said valve into independent open-ended chambers, a piston slidably mounted inside the sleeve, a crank-shaft connected to the piston, and means for actuating the sleeve and the rotatable valve so that the feed and discharge orifices in the rotatable valve register with the passage in the cylinder during the feed and discharge periods respectively.

2. An apparatus of the class described comprising in combination a cylinder having at least two passages formed in the wall thereof, a cylindrical sleeve slidably mounted inside the cylinder, said sleeve having at least two slots therethrough, located so as to come opposite the passages in the cylinder wall during part of the sliding movement of the sleeve, a pair of rotatable valves controlling the passage in the cylinder wall, each of said valves having independent feed and discharge orifices therein, a piston slidably mounted inside the sleeve, a crank-shaft connected to the piston, means for rotating the valves in opposite directions at the same speed, and means for reciprocating the sleeve in predetermined relation to the movement of the piston and the speed of rotation of the valves.

3. The method of reversing the direction of rotation of a motor provided with a cylinder, a piston, a crank-shaft connected to the piston and a pair of interchangeable oppositely rotatable valves each controlling the feed and discharge of motor fluid to the cylinder which comprises the step of interchanging the rotatable valves.

In testimony whereof I have hereunto set my hand.

ALEXANDRE CARDUNETS TALLADE.